Feb. 20, 1951 D. L. HINGS 2,542,522
WIND IMPELLER AND ELECTRIC GENERATOR
Filed Aug. 23, 1945 3 Sheets-Sheet 2
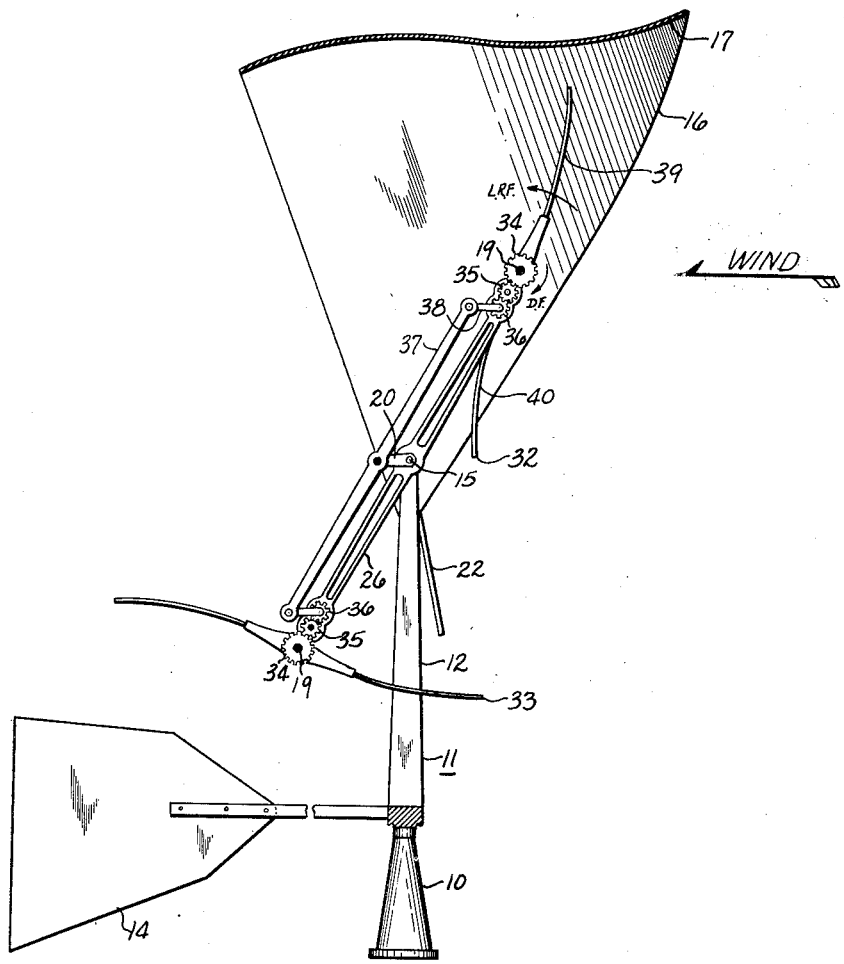
Fig. 2
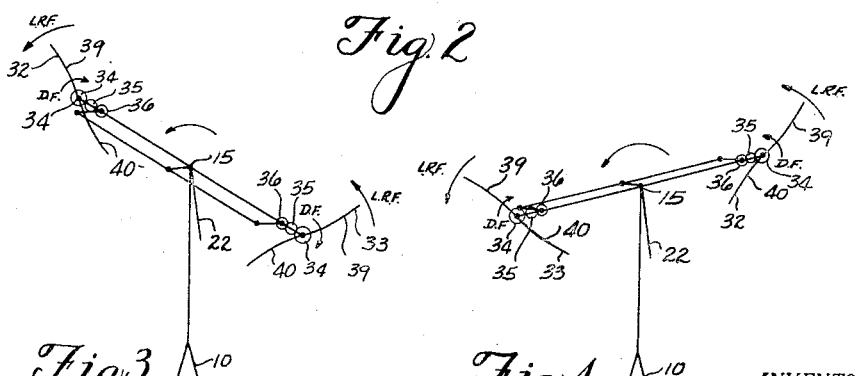
Fig. 3
Fig. 4
INVENTOR.
Donald L. Hings.
BY
Stoodling and Frost
attys.

Patented Feb. 20, 1951

2,542,522

UNITED STATES PATENT OFFICE 2,542,522

WIND IMPELLER AND ELECTRIC GENERATOR

Donald L. Hings, Ottawa, Ontario, Canada, assignor, by mesne assignments, to Cornell-Dubilier Electric Corporation, South Plainfield, N. J., a corporation of Delaware Application August 23, 1945, Serial No. 612,262
In Canada July 20, 1945

14 Claims. (Cl. 290—55)

My invention relates in general to fluid impellers and more particularly to wind impellers having a high degree of efficiency, made possible through the control of the disposition of the impeller blades.

An object of my invention is the provision of a wind impeller which, through a method of control, keeps the plane of the power impeller blade upon which the wind is exerting a driving force substantially perpendicular to the wind for a certain portion of the power rotating cycle and for keeping the plane of the returning blade substantially parallel to the direction of the wind, with the result that the return blade may be returned to its power driven position with a minimum of wind opposition.

Another object of my invention is the provision of a wind impeller having rotating blades mounted on the ends of a rotating impeller spider, taken in combination with a linkage system which rotates the blades about their own axes, such that the blades rotate through a one-half cycle, while the rotating impeller spider rotates through one complete cycle.

Another object of my invention is the provision of a linkage system which varies the plane of the blades with respect to each other as the rotating impeller upon which the blades are rotatively mounted revolves through a cycle of revolution.

Another object of my invention provides for keeping the plane of the returning blade substantially at right angles to the plane of the power driven blade upon which the wind is directly striking for generating power.

Another object of my invention is the provision of a wind tunnel which provides for directing and concentrating the wind upon the blades which are delivering power to the system.

Another object of my invention is to provide for varying the rotation of the blades relative to the wind by a control vane which is responsive to the velocity of the wind.

Another object of my invention is the provision of utilizing the load torque generated by the wind impeller for actuating the linkage system such that the angle at which the wind strikes the blade is maximum when the load torque requirements are maximum.

Other objects and a fuller understanding of my invention may be had by referring to the following description and claims, taken in conjunction with the accompanying drawings, in which:

Figure 2 is a cross-sectional view of my wind impeller, taken along a vertical cutting plane which is slightly to the left of the vertical center of Figure 1;

Figure 3 is a diagrammatic illustration of the position of the blades at a different point in the rotating cycle of the impeller spider;

Figure 4 is a view similar to Figure 3, but shows the blades and the rotating impeller spider in a different angular position.

Figure 1:
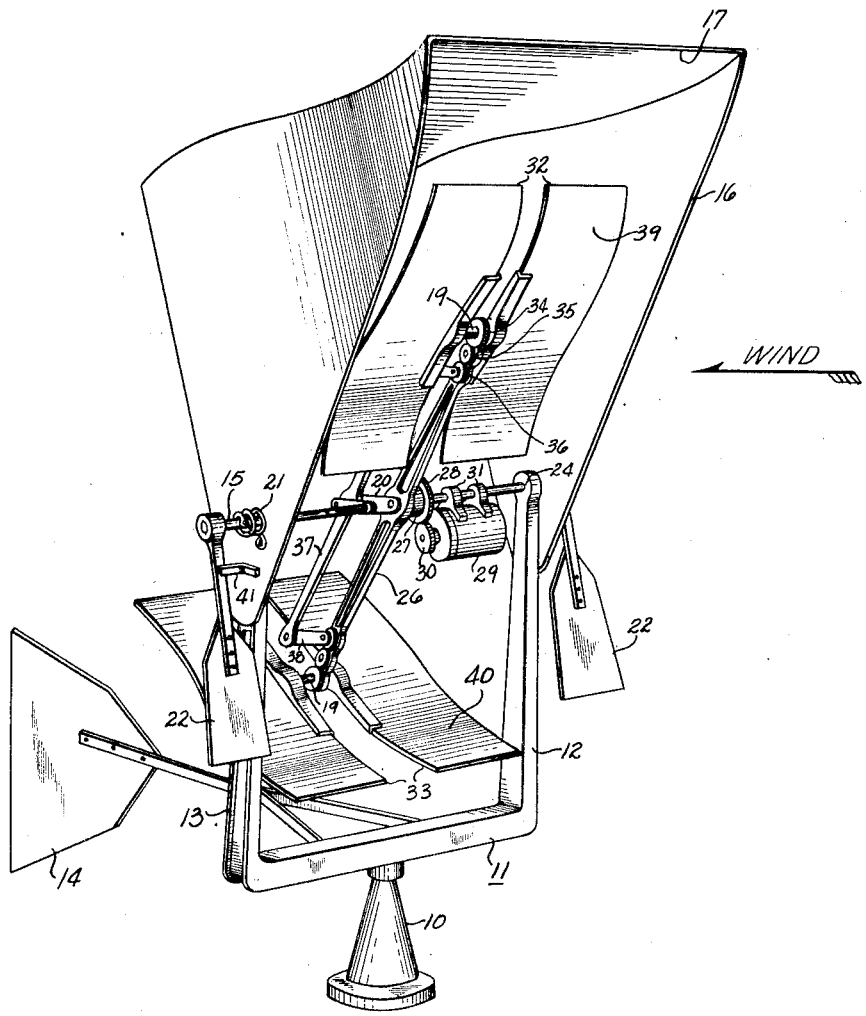
Figure 1 represents a perspective front view of a wind impeller embodying the features of my invention.

With reference to the drawings, my wind impeller may be mounted upon a standard 10 which may be fastened to any suitable structure for mounting the wind impeller in the air where it is accessible to the wind. Turnably mounted upon the standard 10 is a turnable frame 11 having two spaced-apart, upright, side members 12 and 13. A wind direction vane 14 is connected to the turnable frame 11 for directing the wind impeller normal to the oncoming wind. The upper ends of the side members 12 and 13 have bearing openings 24 therein in which is turnably mounted a control shaft 15 which has both of its ends overhanging the bearings 24. Each of the ends of the control shaft 15 are provided with control vanes 22 which control the angular position of the control shaft 15. A spring 21 which surrounds the control shaft is adapted to constrain the control vanes 22 against a stop 41. Thus, as the wind velocity increases, the control vanes 22 are actuated rearwardly for turning the control shaft in a clockwise direction, as viewed from the left-hand side of the wind impeller in Figure 1. The intermediate portion of the control shaft is provided with a fixed crank arm 20 which pivotally carries a control linkage connecting rod 37. Upon the control shaft 15, immediately to the right of the crank arm 20, is a power rotating impeller spider 26. In the drawing, the spider is shown as having two arms, but, in my invention, any number of arms may be provided, preferably three or any other odd number. The spider 26 is anchored to a bearing 27 which floats about the control shaft 15. Thus, the spider 26 and the bearing 27 are free to rotate about the control shaft 15. In the drawing, a driving gear 28, connected to the spider, is arranged to drive a gear 30 which rotates the armature of a generator 29 which is suspended from brackets 31 that are non-rotatively connected to the control shaft 15. Although I illustrate my wind impeller as driving a generator for generating electric current, it is to be understood that the gear 28 may be employed to drive any other gear for operating devices other than a generator. Mounted upon shafts 19 on the ends of the spider arms are pairs of blades 32 and 33. The pairs of impeller blades are identical in construction, but a different reference character has been applied thereto for the purpose of describing the operation of the device. Each of the pair of blades are rotatively mounted in the ends of the spider arms. As illustrated, the shafts 19 upon which the pair of impeller blades are mounted have rotating gears 34 which are adapted to rotate the blades about their own axes as the spider rotates about the control shaft 15. The rotation of the gears 34 and consequently the rotation of the pair of impeller blades about their own axes is adapted to be governed by a control linkage that connects the ends of the rod 37 respectively to a set of gears 35 and 36 which mesh with the gears 34. The gears are rotatively mounted on the spider arm. The gears 36 are adapted to be rotated about their axes by crank links 38 that are connected respectively to the ends of the control linkage connecting rod 37. The gears 35 which are intermediate the gears 34 and the gears 36 constitute idle gears and are employed for reversing the rotation of the gears 34 with respect to the gears 36. As the wind rotates the spider arms about the axis of the control shaft 15, the action of the control linkage connecting rod 37 and the crank links 48 is such as to rotate the gears 36 about their own axes. Thus, the gears 36 rotate through one complete revolution about their own axes as the spider makes one complete revolution. The diameter of the gears 34 is twice as large as the diameter for the gears 36, and thus the gears 34 and the pair of blades rotate through one half a revolution for each revolution of the spider 26. The pair of blades 32 and the pair of blades 33 are so mounted that the angle between the planes of the blades 32 and 33 is substantially ninety degrees, making the blades perpendicular to each other. This perpendicular or ninety-degree relationship is maintained throughout the complete revolution of the spider. In order to increase the efficiency of my impeller, I have mounted a tunnel 16 to the side members 12 and 13 of the turnable frame. As the blades pass through the tunnel, the surfaces thereof are maintained substantially normal to the wind, whereby a maximum amount of power is developed. The top and the sides of the tunnel at its entrance end 17 are flared outwardly to present an enlarged entrance for receiving a large amount of air. The sides of the tunnel are relatively close to the blades so as to prevent any appreciable leakage of air therebetween. Substantially, the rearward half portion of the top of the tunnel is slightly curved, so that, when the tips of the blades reach the rearward half of the top of the tunnel, there is a close tip clearance between the ends of the blades and the top of the tunnel. This close tip clearance provides for increasing the efficiency of the impeller. In other words, by the use of the tunnel 16, the impeller will operate at a lower wind velocity.

In operation, the returning blades, such, for example, as the blades 33 in the drawing, are held in a plane substantially parallel to the direction of the wind, so that the returning blades offer substantially no opposition for slowing up the rotation of the spider. The driving or power blades, such, for example, as the blades 32 in the drawing, are maintained substantially normal or perpendicular to the direction of the wind as they pass through the tunnel 16, whereby a maximum amount of power is developed for rotating the spider. The Figure 3 shows the position of the blades 32 and 33 after the spider has been rotated through an angle substantially ninety degrees from that shown in Figure 2 of the drawing, and Figure 4 shows the position of the blades after the spider has been rotated substantially one hundred and thirty-five degrees from the position shown in Figure 2. In Figure 3, the wind striking the blades 32 tends to push the blades downwardly and the wind which engages the blades 33 tends to lift them upwardly, with the result that both of the blades 32 and 33 are delivering power for rotating the spider in a counter-clockwise direction. In Figure 4, the blades 32 are functioning to lift the spider arm to which they are attached and the pair of blades 33 tend to lower the spider arm to which they are attached, with the result that both of the pairs of blades operate to rotate the spider in a counterclockwise direction.

The operation of my device throughout one complete cycle of operation will next be described. For the purposes of this description, angular rotation shall be described as clockwise or counter-clockwise as viewed in the Figures 2, 3, 4, and 5, of the drawing for purposes of simplicity. The crank arm 20, which is rigidly fastened on the control shaft 15, is angularly positioned by the control vane 22. The control vanes 22 are positioned by the force of the fluid velocity acting against the urging of the spring 21. The crank arm 20 therefore positions the control linkage connection rod 37 which in turn positions the crank links 38. Assuming for the purpose of this description of the operational cycle, a steady wind condition wherein the control vanes 22 are held relatively motionless, the crank links 38 will be held angularly motionless in space, at a fixed angle to the horizontal as the spider 26 rotates about the control shaft 15. The linkage driven gears 36 being firmly attached to the crank links 38, are therefore prevented from rotating in space as the spider 26 rotates. The gears 36 being held relatively motionless in space therefore means that the gears 36 rotate one complete revolution with respect to the spider 26 as the spider 26 rotates one complete revolution. The wind being as shown in the drawing, that is, coming from the right hand edge of the drawing, will strike the pair of blades 32 and cause them to force the spider 26 in a counter-clockwise direction. The connecting rod 37 therefore likewise is rotated in a counter-clockwise direction and the gears 36 are therefore rotated in a clockwise direction with respect to the spider 26, wherein the counter-clockwise rotational direction of the spider 26 is counterbalanced by the clockwise rotational direction of the gear 36 to cause the gear 36 to be maintained in a relatively angularly unchanged position in space as the spider 26 is rotated. The intermediate gears 35 which mesh with the gears 36 are necessarily driven in a reverse direction from the gears 36, and therefore rotate in a counter-clockwise direction. The rotating gears 34, being driven by the intermediate gears 35, are therefore rotated in a clockwise direction as the spider 26 rotates. Since the gears 34 are twice the diameter of the gears 35, the gears 34 and also the blades firmly there-attached, will rotate in a clockwise direction at one-half the rotational speed of the spider 26. Referring more particularly to the Figure 2 of the drawing, I show the pair of blades 32 in a substantially vertical position, and the pair of blades 33 in a substantially horizontal position. As the wind forces the pair of blades 32 in a rearwardly or counter-clockwise direction, the pair of blades 32 themselves are actually caused by the gear train to move in a clockwise direction. When the wind has caused the spider 26 to rotate approximately 90 degrees, the pair of blades 32 will then be just to the rear of the tunnel 16, and the blades will therefore have rotated approximately one-eighth of a revolution or approximately 45 degrees from the vertical, sloping upwardly to the left. With another quarter revolution of the spider 26, the pair of blades 32 will now be in a position roughly equivalent to the position of the blades 33 as shown in Figure 2 of the drawing, and the pair of blades 33 will now have taken the place of the pair of blades 32. With another quarter revolution of the spider 26, the pair of blades 32 will be positioned downwardly and to the front of the tunnel 16, and positioned approximately 45 degrees from the horizontal sloping downwardly to the left. The completed revolution of the spider 26 will find that the blades 32 and the blades 33 are apparently positioned identically to their position before starting the rotational cycle, yet actually the blades 32 have made only one-half revolution, and therefore the tips of the blades that were formerly near the top of the tunnel are therefore now near the bottom of the tunnel. One more complete revolution of the spider 26 is therefore necessary to cause the pair of blades 32 and 33 to come back to their identical position before starting the rotational cycle two cycles before.

Figure 5:
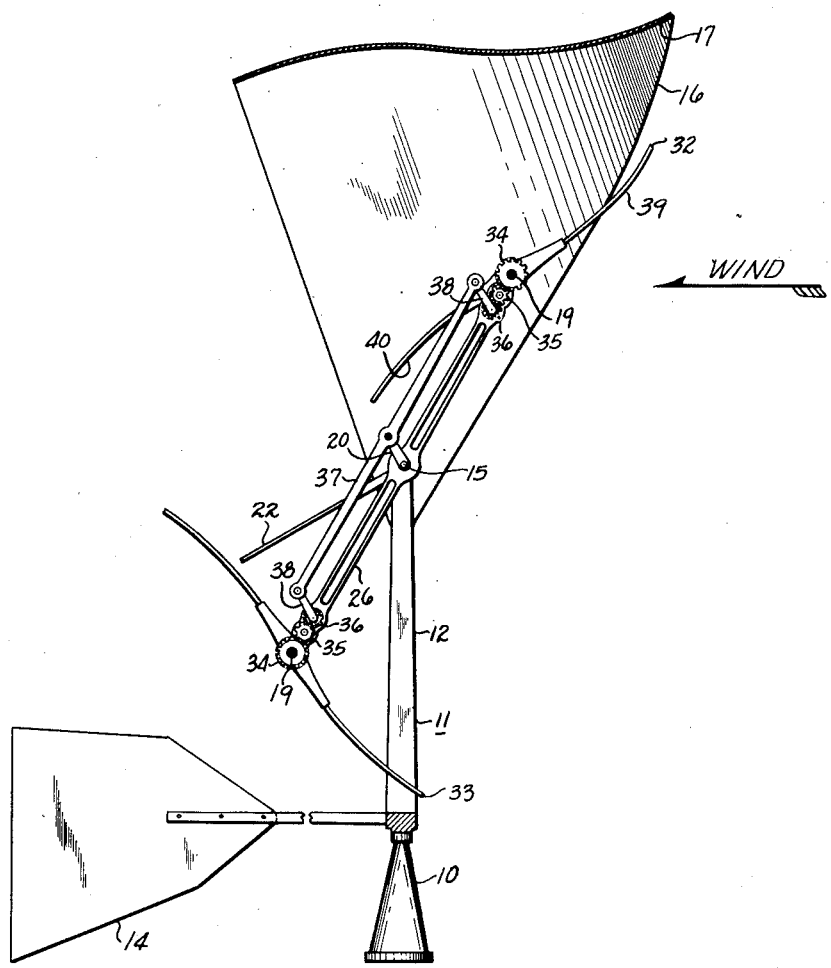
Figure 5 is a view similar to Figure 2, but shows the control vane actuated in its rearwardmost position under the condition of maximum wind velocity, with the result that the impeller blades are rotated about their own axes to their minimum power delivering position.

Figures 1, 2, 3 and 4 show the control vanes 22 engaging the stops 41. In this position, the impeller will operate at a minimum amount of wind velocity. As the wind velocity increases, the control vanes 22 are pushed rearwardly, and thus they turn the control shaft 15 in a clockwise direction. This rotation of the control shaft 15 moves the position of the control linkage connecting rod 37 which rotates the train of gears for shifting or turning the blades about their own axes, decreasing the angle between the blades 32 and the wind and increasing the angle between the wind and the blades 33. The Figure 5 shows the position of the blades when the control vanes 22 are pushed in their rearwardmost position by a strong wind. It is to be noted that the position of the spider arms in Figure 5 is the same as it is in Figure 2, but that the blades in Figure 5 have been rotated in a clockwise direction from Figure 2. The amount that the blades have been rotated in Figure 5 over Figure 2 represents the swing through which they move as the control vanes 22 are moved from the stops 41 to their rearwardmost position caused by a strong wind. It is also noted that the tip clearance between the blades and the top of the tunnel has materially increased with the position of the blades in Figure 5, so that the amount of power developed between a strong wind and a weak wind is kept relatively constant.

Inasmuch as the generator 29 is suspended on the brackets 31 which are non-rotatively connected to the control shaft 15, it is to be noted that, when an increased load is placed upon the generator under a strong wind condition, a torque action will be set up between the driving gear 28 and the driven gear 30, such as to rotate the control shaft 15 independently of the wind velocity. I am assuming that the generator 29 is connected to an electrical load, which is variable in nature. The strong wind condition aforementioned will cause the control vanes 22 to be forced rearwardly against the action of the springs 21 away from the stops 41, which control vanes 22 control the pitch of the blades 32 and 33 to maintain a substantially constant mechanical output of the device. Now, as the electrical load to the generator 29 is increased, the armature of the generator 29 therefore becomes harder to turn, and the driven gear 30 which is attached to the armature consequently requires more torque to be rotated by the driving gear 28. This causes a torque action in opposition to the torque produced by the wind on the control vanes 22, which means that the entire generator 29 rotates the control shaft 15 slightly in a counter-clockwise direction, as viewed in the figures, to make the pitch of the blades more nearly perpendicular to the force of the wind so as to obtain more power output of the wind impeller. This rotational action of the control shaft 15 in a counter-clockwise direction will continue until the increasing mechanical output of the wind impeller equals the required mechanical input of the generator 29 or until the control vanes 22 reach the stop 41, which limits the rotational movement of the control shaft 15 to the maximum power output of my wind impeller. This increased torque is such as to rotate the blades about their own axes in a counter-clockwise direction, whereby the blades passing through the tunnel 16 present an increased effective area for developing more power. Thus, under a condition when the control vanes 22 are being pushed rearwardly, as they will when the wind is relatively strong, which means that the blades under this condition are presenting a reduced amount of effective area to the wind, yet with my torque control, should an increased load be placed upon the generator 29, this will cause the torque to increase for moving the blades in a counter-clockwise direction upon their axes for presenting a larger effective area to the wind. Thus, the position of the blades is governed by the load imposed upon the generator.

It is noted that the upper ends of the blades 32 are curved rearwardly to present a convex surface 39 to the wind and the bottom ends of the blades are curved forwardly to present a concave surface 40 to the wind. The same is true for the blades 33. One object in making the blades curved is to provent the crank arm 20 from stalling on dead center as the spider rotates about the control shaft 15. The differential pressure between the convex portion 39 and the concave portion 40 is such as to provide a rotating force which tends to rotate the blades about their own axes in a clockwise position. This force in Figure 2 is indicated by the arrow labelled DF, meaning differential force, and is opposite to the arrow labelled LRF, meaning linkage rotational force, which positively rotates the blades about their own axes in a counter-clockwise position. When the position of the spider arm is substantially horizontal, the crank arm 20 is substantially on dead center, and thus, in this position, the differential force over-powers the linkage rotational force and thus becomes effective to provide a rotational force which is in the right direction to prevent the crank arm 20 from stalling on dead center. In other words, the linkage rotational force when the crank arm is substantially on dead center approaches zero, in which event the differential force takes over and rotates the crank arm 20 past dead center.

Although I have shown and described my invention with a certain degree of particularity, it is understood that changes may be made therein without departing from the spirit of the invention which are included within the scope of the claims hereinafter set forth.

I claim as my invention:

1. A fluid impeller comprising, in combination, a turnable frame, a control shaft having a crank arm turnably mounted in the frame, a control vane connected to the control shaft and adapted to rotate same in response to the fluid velocity, a spider having arms rotatively mounted upon the control shaft, blades mounted upon the spider arms and adapted to be rotated about their own axes, a linkage system including a linkage connecting rod mounted on the crank arm and a train of gears rotated in response to the crank arm movement for positioning the blades about their own axes.

2. A fluid impeller comprising, in combination, a turnable frame, a control shaft having a crank arm turnably mounted in the frame, a control vane connected to the control shaft and adapted to rotate same in response to the fluid velocity, a spider having arms rotatively mounted upon the control shaft, blades mounted upon the spider arms and adapted to be rotated about their own axes, a gear connected to the blades for rotating same, a second gear adapted to engage the first gear, a third gear adapted to engage the second gear, said gears being rotatively mounted on the spider arm carrying the said blades, a linkage connecting rod adapted to be actuated by the crank arm, and a crank link interconnecting the connecting rod and the third gear whereby rotation of the spider arm rotates the said gears, the said first gear having a diameter substantially twice the diameter of the third gear whereby the blades are rotated upon their axes one half of a revolution for each revolution of the spider.

3. A fluid impeller comprising, in combination, a turnable frame, a control shaft having a crank arm turnably mounted in the frame, a control vane connected to the control shaft and adapted to rotate same in response to the fluid velocity, a spider having arms rotatively mounted upon the control shaft, blades mounted upon the spider arms and adapted to be rotated about their own axes, a gear connected to the blades for rotating same, a second gear adapted to engage the first gear, a third gear adapted to engage the second gear, said gears being rotatively mounted on the spider arm carrying the said blades, a linkage connecting rod adapted to be actuated by the crank arm, and a crank link interconnecting the connecting rod and the third gear whereby rotation of the spider arm rotates the said gears, the said first gear having a diameter substantially twice the diameter of the third gear whereby the blades are rotated upon their axes one half of a revolution for each revolution of the spider, the said connecting rod, crank link and said gears maintaining the blades during the return portion of the cycle substantially parallel to the direction of the fluid and maintaining the blades during the power portion of the cycle substantially perpendicular to the direction of the fluid.

4. A fluid impeller comprising, in combination, a turnably mounted control shaft having a crank arm, a spider arm rotatively mounted about the control shaft, a blade rotatively mounted upon the spider arm, a first gear connected to the said blade, a second gear adapted to engage the first gear, a third gear adapted to engage the second gear, said gears being rotatively mounted upon the spider arm, a connecting rod actuated by the crank arm, and a crank link interconnecting the connecting rod and the third gear whereby rotation of the spider arm rotates the third gear through one revolution upon each revolution of the spider arm, the diameter of the first gear being substantially twice the diameter of the third gear whereby the blade is rotating one half of a revolution for each revolution of the spider arm.

5. A fluid impeller comprising, in combination, a turnably mounted control shaft having a crank arm, a spider arm rotatively mounted about the control shaft, a blade rotatively mounted upon the spider arm, a first gear connected to the said blade, a second gear adapted to engage the first gear, a third gear adapted to engage the second gear, said gears being rotatively mounted upon the spider arm, a connecting rod actuated by the crank arm, and a crank link interconnecting the connecting rod and the third gear whereby rotation of the spider arm rotates the third gear through one revolution upon each revolution of the spider arm, the diameter of the first gear being substantially twice the diameter of the third gear whereby the blade is rotating one half of a revolution for each revolution of the spider arm, said blade having on one side of its axis about which it rotates a convex portion and having on its other side a concave portion for developing a differential dynamic force for rotating the blade to prevent the crank arm from stalling on dead center.

6. A fluid impeller comprising, in combination, a turnably mounted control shaft having a crank arm, a spider arm rotatively mounted about the control shaft, a blade rotatively mounted upon the spider arm, a first gear connected to the said blade, a second gear adapted to engage the first gear, a third gear adapted to engage the second gear, said gears being rotatively mounted upon the spider arm, a connecting rod actuated by the crank arm, a crank link interconnecting the connecting rod and the third gear whereby rotation of the spider arm rotates the third gear through one revolution upon each revolution of the spider arm, the diameter of the first gear being substantially twice the diameter of the third gear whereby the blade is rotating one half of a revolution for each revolution of the spider arm, and a tunnel means through which the blade travels during the portion of its cycle which develops the greatest amount of power.

7. A fluid impeller comprising, in combination, a turnably mounted control shaft having a crank arm, a spider arm rotatively mounted about the control shaft, a blade rotatively mounted upon the spider arm, a first gear connected to the said blade, a second gear adapted to engage the first gear, a third gear adapted to engage the second gear, said gears being rotatively mounted upon the spider arm, a connecting rod actuated by the crank arm, a crank-link interconnecting the connecting rod and the third gear whereby rotation of the spider arm rotates the third gear through one revolution upon each revolution of the spider arm, the diameter of the first gear being substantially twice the diameter of the third gear whereby the blade is rotating one half of a revolution for each revolution of the spider arm, a gear driven by the spider arm, said gear being rotatively mounted around the control shaft, a generator suspended from the control shaft and non-rotatively connected thereto, a gear on the generator and inter-meshing with the gear driven by the spider whereby when an increased load is imposed upon the generator the increased torque required by the generator rotates the control shaft for varying the position of the blades with respect to the direction of the driving fluid.

8. A fluid impeller comprising, in combination, a turnable frame, a control shaft having a crank arm turnably mounted in the frame, a control vane connected to the control shaft and adapted to rotate same in response to the fluid velocity, a spider having arms rotatively mounted upon the control shaft, blades mounted upon the spider arms and adapted to be rotated about their own axes, a linkage system including a linkage connecting rod mounted on the crank arm and a train of gears rotated in response to the crank arm movement for positioning the blades about their own axes, and means responsive to the mechanical output required to rotatively position said blades.

9. An energy transfer system including a base, revoluble support means having a first axis and being rotatively mounted on said base, a mechanism being rotatably connected to said revoluble support means, at least one fluid impeller means having a second axis, means for rotatably mounting said at least one impeller means on said revoluble support means with said axes spaced apart, interconnecting means between said revoluble support means and said impeller means for rotating said impeller means one half revolution for one revolution of said revoluble support means, said impeller means having a first position of maximum thrust and a second position of minimum thrust at a given point in the revolution of said revoluble support means, and control means controlling said interconnecting means for governing the position of said impeller means relative to said revoluble support means, said control means including fluid velocity-responsive means for positioning said impeller means closer toward second position at said given point as the fluid velocity increases and vice versa, spring means for urging the impeller means toward said first position, and means responsive to the increase of power transferred between said impeller means and said mechanism for positioning said impeller means closer toward said first position and vice versa.

10. An energy transfer system including a base, revoluble support means having a first axis and being rotatively mounted on said base, a mechanism having a rotor and a stator, a control shaft axially coextensive with said first axis, said stator being fixedly carried by said control shaft, said rotor having a third axis spaced apart and parallel to said first axis, said rotor being rotatably connected to said revoluble support means, at least one fluid impeller means having a second axis, means for rotatably mounting said at least one impeller means on said revoluble support means with said first and second axes spaced apart and parallel to each other, interconnecting means between said revoluble support means and said impeller means for rotating said impeller means one half revolution in the same direction in space for one revolution of said revoluble support means, said impeller means having a first position of maximum thrust and a second position of minimum thrust at a given point in the revolution of said revoluble support means, and control means controlling said interconnecting means for governing the position of said impeller means relative to said revoluble support means, said control means including fluid velocity-responsive means for positioning said impeller means closer toward said second position at said given point as the fluid velocity increases and vice versa, spring means for urging the impeller means toward said first position, means for mounting said fluid velocity-responsive means on said control shaft, and means for mounting said spring means between said control shaft and said base.

11. An energy transfer system including a base, revoluble support means having a first axis and being retatively mounted on said base, a mechanism having a rotor and a stator, a control shaft axially coextensive with said first axis, said stator being fixedly carried by said control shaft, said rotor having a third axis spaced apart and parallel to said first axis, said rotor being rotatably connected to said revoluble support means, at least one fluid impeller means having a second axis, means for rotatably mounting said at least one impeller means on said revoluble support means with said first and second axes spaced apart and parallel to each other, interconnecting means between said revoluble support means and said impeller means for rotating said impeller means one half revolution in the same direction in space for one revolution of said revoluble support means, said impeller means having a first position of maximum thrust and a second position of minimum thrust at a given point in the revolution of said revoluble support means, and control means controlling said interconnecting means for governing the position of said impeller means relative to said revoluble support means, said control means including fluid velocity-responsive means for positioning said impeller means closer toward second position at said given point as the fluid velocity increases and vice versa, spring means for urging the impeller means toward said first position, means for mounting said fluid velocity-responsive means on said control shaft, and means for mounting said spring means between said control shaft and said base, said mechanism including a dynamo-electric machine.

12. A fluid impeller comprising, in combination, a rotatable control shaft, a spider arm rotatively mounted about said control shaft, a blade rotatively mounted upon the spider arm and positionable by said control shaft, a rotating body adapted to be driven from said spider arm, said rotating body having an axis spaced from the axis of said control shaft, stator means fixedly connected to said control shaft for rotatively supporting said rotating body, and a variable load between said rotating body and said stator means.

13. A fluid impeller comprising, in combination, a rotatable control shaft, a spider arm rotatively mounted about said control shaft, a blade rotatively mounted upon the spider arm and positionable by said control shaft, support links fixedly mounted on said control shaft, a secondary shaft journaled in said support links, means for rotating said secondary shaft on its own axis from said spider arm, and a load of variable magnitude driven by said secondary shaft, increases of said load increasing the force required to rotate said secondary shaft and hence revolving said secondary shaft and said control shaft about the axis of said control shaft in a direction to position said blade to effect an increase of power output of said fluid impeller.

14. A fluid impeller comprising, in combination, a rotatable control shaft, a spider arm rotatively mounted about said control shaft, a blade rotatively mounted upon the spider arm and positionable by said control shaft, support links fixedly mounted on said control shaft, a secondary shaft journaled in said support links, means for rotating said secondary shaft on its own axis from said spider arm, a load of variable magnitude driven by said secondary shaft, increases of said load increasing the force required to rotate said secondary shaft and hence revolving said secondary shaft and said control shaft about the axis of said control shaft in a direction to position said blade to effect an increase of power output of said fluid impeller, and fluid velocity responsive means having a torque opposing the torque of said load to rotate said control shaft upon decreases of said load to effect a decrease of power output of said fluid impeller.

DONALD L. HINGS.

REFERENCES CITED

The following references are of record in the file of this patent:

UNITED STATES PATENTS

| Number | Name | Date |
|---|---|---|
| 16,616 | Tuttle | Feb. 10, 1857 |
| 662,944 | Jones | Dec. 4, 1900 |
| 754,477 | Mikkelsen | Mar. 15, 1904 |
| 999,423 | Woodrum | Aug. 1, 1911 |
| 1,063,973 | Houston | June 10, 1913 |
| 1,219,339 | Manning | Mar. 13, 1917 |
| 1,265,137 | Tayloe | May 7, 1918 |
| 1,420,652 | Fullwood | June 27, 1922 |
| 1,465,593 | Barrett et al. | Aug. 21, 1923 |
| 1,639,908 | Strandgren | Aug. 23, 1927 |
| 1,651,067 | Nitardy | Nov. 29, 1927 |
| 1,741,247 | Nitardy | Dec. 31, 1929 |
| 1,753,252 | Strandgren | Apr. 8, 1930 |
| 1,885,640 | Strandgren | Nov. 1, 1932 |
| 2,128,592 | Mushkin | Aug. 30, 1938 |
| 2,129,652 | Dean | Sept. 13, 1938 |
| 2,319,592 | Fiedler | May 18, 1943 |
| 2,360,792 | Putman | Oct. 17, 1944 |

FOREIGN PATENTS

| Number | Country | Date |
|---|---|---|
| 13,417 | Great Britain | 1912 |